(12) United States Patent
Chamberlain

(10) Patent No.: US 7,779,481 B2
(45) Date of Patent: Aug. 17, 2010

(54) SYSTEMS AND METHODS FOR ELECTRONIC POSTMARKING OF DATA INCLUDING LOCATION DATA

(75) Inventor: Charles R. Chamberlain, Arlington, VA (US)

(73) Assignee: United States Postal Service, Washington, DC (US)

( * ) Notice: Subject to any disclaimer, the term of this patent is extended or adjusted under 35 U.S.C. 154(b) by 1052 days.

(21) Appl. No.: 10/474,730

(22) PCT Filed: Apr. 12, 2002

(86) PCT No.: PCT/US02/11380
§ 371 (c)(1),
(2), (4) Date: Oct. 14, 2003

(87) PCT Pub. No.: WO02/084945
PCT Pub. Date: Oct. 24, 2002

(65) Prior Publication Data
US 2004/0133524 A1 Jul. 8, 2004

Related U.S. Application Data

(60) Provisional application No. 60/283,139, filed on Apr. 12, 2001.

(51) Int. Cl.
*H04L 9/30* (2006.01)
*G07B 17/04* (2006.01)

(52) U.S. Cl. .................................. 726/28; 705/408

(58) Field of Classification Search ......... 342/450–451, 342/461–462, 459; 340/426.19, 539.13–539.19, 340/825.49, 5.81, 5.8; 701/28, 32, 35, 213–216; 705/405, 408, 401; 726/28
See application file for complete search history.

(56) References Cited

U.S. PATENT DOCUMENTS

| 472,105 A | 4/1892 | Bussard |
| 481,772 A | 8/1892 | Spear |

(Continued)

FOREIGN PATENT DOCUMENTS

| EP | 0 516 898 A1 | 12/1992 |

(Continued)

OTHER PUBLICATIONS

ComRoad AG, CASIO and ComROAD Co-operate in the Opening-Up of the Telematic Consumer Market, Feb. 9, 2000, [retrieved Jun. 14, 2002]. Retrieved form the Internet: <URL: http://www.comroad.com/presse_data/0902.htm>., pp. 1-5, especially, p. 2, first paragraph in the English language; and p. 5.

(Continued)

*Primary Examiner*—Gilberto Barron, Jr.
*Assistant Examiner*—Venkat Perungavoor
(74) *Attorney, Agent, or Firm*—Finnegan, Henderson, Farabow, Garrett & Dunner, L.L.P.

(57) ABSTRACT

Systems and mehods for electronic postmarking of location data are provided. Electronic postmarking of location data (S.20) includes generating a hash value corresponding to merged data (S.30). Electronic postmarking further includes generating an electronic postmark data structure (S.40) comprising the hash value and a date/time stamp. The electronic postmarking data structure (S.40) may further include a digital signature.

24 Claims, 5 Drawing Sheets

U.S. PATENT DOCUMENTS

| | | | |
|---|---|---|---|
| 1,750,339 A | 3/1930 | Wood | |
| 3,229,903 A | 1/1966 | Smith | |
| 4,135,662 A | 1/1979 | Dlugos | |
| 4,309,569 A | 1/1982 | Merckle | |
| 4,574,352 A | 3/1986 | Coppola et al. | |
| 4,725,718 A | 2/1988 | Sansone et al. | |
| 4,727,368 A | 2/1988 | Larson et al. | |
| 4,816,824 A | 3/1989 | Katz et al. | |
| 5,043,908 A | 8/1991 | Mandulay et al. | |
| 5,136,646 A | 8/1992 | Haber et al. | |
| 5,136,647 A | 8/1992 | Haber et al. | |
| 5,189,700 A * | 2/1993 | Blandford | 713/178 |
| 5,223,829 A | 6/1993 | Watabe | |
| 5,227,778 A | 7/1993 | Vacon et al. | |
| 5,341,505 A | 8/1994 | Whitehouse | |
| 5,373,561 A | 12/1994 | Haber et al. | |
| 5,377,354 A | 12/1994 | Scannell et al. | |
| 5,387,783 A | 2/1995 | Mihm et al. | |
| 5,404,231 A | 4/1995 | Bloomfield | |
| RE34,954 E | 5/1995 | Habbel et al. | |
| 5,448,641 A * | 9/1995 | Pintsov et al. | 380/51 |
| 5,481,464 A | 1/1996 | Ramsden | |
| 5,490,077 A | 2/1996 | Freytag | |
| 5,573,178 A | 11/1996 | Worden | |
| 5,619,648 A | 4/1997 | Canale et al. | |
| 5,631,827 A | 5/1997 | Nicholls et al. | |
| 5,638,446 A | 6/1997 | Rubin | |
| 5,648,916 A | 7/1997 | Manduley et al. | |
| 5,701,770 A | 12/1997 | Cook et al. | |
| 5,703,951 A | 12/1997 | Dolphin | |
| 5,710,887 A | 1/1998 | Chelliah et al. | |
| 5,717,597 A * | 2/1998 | Kara | 705/408 |
| 5,729,594 A | 3/1998 | Klingman | |
| 5,742,829 A | 4/1998 | Davis et al. | |
| 5,752,059 A | 5/1998 | Holleran et al. | |
| 5,757,916 A | 5/1998 | MacDoran et al. | |
| 5,774,053 A | 6/1998 | Porter | |
| 5,774,086 A | 6/1998 | Guyot | |
| 5,774,802 A | 6/1998 | Tell et al. | |
| 5,781,629 A | 7/1998 | Haber et al. | |
| 5,796,841 A | 8/1998 | Cordery et al. | |
| 5,805,810 A | 9/1998 | Maxwell | |
| 5,819,240 A | 10/1998 | Kara | |
| 5,835,087 A | 11/1998 | Herz et al. | |
| 5,841,550 A | 11/1998 | Johnson | |
| 5,852,813 A | 12/1998 | Guenther et al. | |
| 5,857,188 A | 1/1999 | Douglas | |
| 5,870,549 A | 2/1999 | Bobo, II | |
| 5,878,233 A | 3/1999 | Schloss | |
| 5,883,810 A | 3/1999 | Franklin et al. | |
| 5,889,506 A | 3/1999 | Lopresti et al. | |
| 5,903,878 A | 5/1999 | Talati et al. | |
| 5,910,987 A | 6/1999 | Ginter et al. | |
| 5,917,411 A | 6/1999 | Baggarly | |
| 5,917,925 A | 6/1999 | Moore | |
| 5,930,479 A | 7/1999 | Hall | |
| 5,943,656 A | 8/1999 | Crooks et al. | |
| 5,944,787 A | 8/1999 | Zoken | |
| 5,971,587 A | 10/1999 | Kato et al. | |
| 5,979,750 A | 11/1999 | Kindell | |
| 5,999,967 A | 12/1999 | Sundsted | |
| 6,006,200 A | 12/1999 | Boies et al. | |
| 6,023,723 A | 2/2000 | McCormick et al. | |
| 6,028,517 A | 2/2000 | Sansone et al. | |
| 6,032,133 A | 2/2000 | Hilt et al. | |
| 6,035,402 A | 3/2000 | Vaeth et al. | |
| 6,047,264 A | 4/2000 | Fisher et al. | |
| 6,052,709 A | 4/2000 | Paul | |
| 6,064,995 A | 5/2000 | Sansone et al. | |
| 6,070,798 A | 6/2000 | Nethery | |
| 6,081,899 A | 6/2000 | Byrd | |
| 6,131,067 A * | 10/2000 | Girerd et al. | 701/213 |
| 6,138,910 A | 10/2000 | Madruga | |
| 6,148,289 A | 11/2000 | Virdy | |
| 6,152,369 A | 11/2000 | Wilz, Sr. et al. | |
| 6,161,130 A | 12/2000 | Horvitz et al. | |
| 6,199,102 B1 | 3/2001 | Cobb | |
| 6,219,669 B1 | 4/2001 | Haff et al. | |
| 6,233,565 B1 | 5/2001 | Lewis et al. | |
| 6,233,568 B1 | 5/2001 | Kara | |
| 6,243,620 B1 | 6/2001 | Robinson et al. | |
| 6,246,925 B1 | 6/2001 | Robinson et al. | |
| 6,247,149 B1 | 6/2001 | Falls et al. | |
| 6,259,964 B1 | 7/2001 | Robinson | |
| 6,269,446 B1 | 7/2001 | Schumacher et al. | |
| 6,275,154 B1 | 8/2001 | Bennett et al. | |
| 6,282,658 B2 | 8/2001 | French et al. | |
| 6,285,777 B2 | 9/2001 | Kanevsky et al. | |
| 6,285,991 B1 | 9/2001 | Powar | |
| 6,289,323 B1 | 9/2001 | Gordon et al. | |
| 6,308,277 B1 | 10/2001 | Vaeth et al. | |
| 6,321,333 B1 | 11/2001 | Murray | |
| 6,321,339 B1 | 11/2001 | French et al. | |
| 6,323,782 B1 | 11/2001 | Stephens et al. | |
| 6,347,737 B1 | 2/2002 | Madruga | |
| 6,370,629 B1 | 4/2002 | Hastings et al. | |
| 6,394,565 B1 | 5/2002 | Greenhalgh | |
| 6,425,521 B1 | 7/2002 | Cooper | |
| 6,438,690 B1 | 8/2002 | Patel et al. | |
| 6,442,571 B1 | 8/2002 | Haff et al. | |
| 6,446,045 B1 | 9/2002 | Stone et al. | |
| 6,460,050 B1 | 10/2002 | Pace et al. | |
| 6,463,354 B1 | 10/2002 | Pintsov | |
| 6,480,885 B1 | 11/2002 | Olivier | |
| 6,493,685 B1 | 12/2002 | Ensel et al. | |
| 6,496,936 B1 | 12/2002 | French et al. | |
| 6,587,945 B1 | 7/2003 | Pasieka | |
| 6,604,132 B1 | 8/2003 | Hitt | |
| 6,651,063 B1 | 11/2003 | Vorobiev | |
| 6,654,448 B1 | 11/2003 | Agraharam et al. | |
| 6,675,153 B1 | 1/2004 | Cook et al. | |
| 6,691,231 B1 | 2/2004 | Lloyd et al. | |
| 6,711,624 B1 | 3/2004 | Narurkar et al. | |
| 6,741,724 B1 | 5/2004 | Bruce et al. | |
| 6,745,327 B1 | 6/2004 | Messing | |
| 6,775,782 B1 | 8/2004 | Buros et al. | |
| 6,807,530 B1 | 10/2004 | Shub et al. | |
| 6,882,269 B2 | 4/2005 | Moreno | |
| 6,933,832 B1 | 8/2005 | Simms et al. | |
| 6,967,575 B1 | 11/2005 | Dohrmann et al. | |
| 6,983,194 B1 | 1/2006 | Stadermann | |
| 7,484,088 B2 | 1/2009 | Campbell et al. | |
| 2001/0011274 A1 | 8/2001 | Klug et al. | |
| 2001/0029184 A1 * | 10/2001 | I'Anson et al. | 455/456 |
| 2001/0032115 A1 | 10/2001 | Goldstein | |
| 2001/0032181 A1 | 10/2001 | Jakstadt et al. | |
| 2001/0044785 A1 | 11/2001 | Stolfo et al. | |
| 2002/0002590 A1 | 1/2002 | King et al. | |
| 2002/0023059 A1 | 2/2002 | Bari et al. | |
| 2002/0024438 A1 | 2/2002 | Roberson | |
| 2002/0029248 A1 | 3/2002 | Cook et al. | |
| 2002/0029249 A1 | 3/2002 | Campbell et al. | |
| 2002/0032597 A1 | 3/2002 | Chanos | |
| 2002/0033598 A1 | 3/2002 | Beasley | |
| 2002/0049672 A1 | 4/2002 | Kitchen et al. | |
| 2002/0059381 A1 | 5/2002 | Cook et al. | |
| 2002/0059430 A1 | 5/2002 | Orbke et al. | |
| 2002/0069174 A1 | 6/2002 | Fox et al. | |
| 2002/0103868 A1 | 8/2002 | Khan | |
| 2003/0023561 A1 | 1/2003 | Stefik et al. | |
| 2003/0077409 A1 | 4/2003 | Schnell | |
| 2003/0187951 A1 | 10/2003 | Shen | |
| 2004/0002903 A1 | 1/2004 | Stolfo et al. | |

| | | | |
|---|---|---|---|
| 2005/0033659 | A1 | 2/2005 | Zucker et al. |

FOREIGN PATENT DOCUMENTS

| | | |
|---|---|---|
| JP | 10-124488 | 5/1988 |
| JP | 11331144 A * | 11/1999 |
| WO | WO 97/12460 | 4/1997 |
| WO | WO 99/16226 | 4/1999 |
| WO | WO 99/66428 | 12/1999 |
| WO | WO 00/13368 | 3/2000 |
| WO | WO 01/00069 | 1/2001 |
| WO | WO 01/18718 A1 | 3/2001 |
| WO | WO 01/65444 | 9/2001 |
| WO | WO 01/99005 | 12/2001 |
| WO | WO 01/99009 | 12/2001 |
| WO | WO 01/99037 | 12/2001 |
| WO | WO 02/08961 | 1/2002 |
| WO | WO 02/21315 | 3/2002 |
| WO | WO 02/066344 | 8/2002 |
| WO | WO 02/079947 | 10/2002 |
| WO | WO 03/023677 | 3/2003 |

OTHER PUBLICATIONS

"A new look for MSDS". Campbell, Sharon Lynn. Occupational Health and Safety. Waco: Jun. 1992. vol. 61, Issue 6; p. 62 [retrieved from ProQuest Dec. 19, 2005] (5 pages).
"American Express Invests in Respond.com," M2 Presswire, Mar. 9, 2000 [recovered from Dialog database on Jun. 5, 2007].
Appendix K (USPS Burke Test Site Report), "User Interface Review of Mail Item Retrieval System (MIRS), Burke Station, Burke Virginia" (Dec. 24, 1998); appendix of USPS Mail Item Retrieval System (MIRS) Phase 2 Limited Production Self-Service Statement of Work (SOW) (SOW can be found in U.S. Appl. No. 60/255,407, filed Dec. 15, 2000, which is incorporated by reference into Pending U.S. Appl. No. 10/311,742, filed Dec. 19, 2002).
Appendix L, "In-plant Test Report (Re-Test Failed Items), Mail Item Retrieval System (MIRS)" (Oct. 21, 1998); appendix of USPS Mail Item Retrieval System (MIRS) Phase 2 Limited Production Self-Service Statement of Work (SOW) (SOW can be found in U.S. Appl. No. 60/255,407, filed Dec. 15, 2000, which is incorporated by reference into Pending U.S. Appl. No. 10/311,742, filed Dec. 19, 2002).
Appendix M, "Heuristic Evaluation of the USPS Mail Item Retrieval System Early Prototype," by R. Hoffman and E. Nelson, Mitretek Systems (May 11, 1998); appendix of USPS Mail Item Retrieval System (MIRS) Phase 2 Limited Production Self-Service Statement of Work (SOW) (SOW can be found in U.S. Appl. No. 60/255,407, filed Dec. 15, 2000, which is incorporated by reference into Pending U.S. Appl. No. 10/311,742, filed Dec. 19, 2002).
Article 34 Amendment for PCT/US01/19698, dated Jan. 18, 2002 (2 pages), (relates to WO 01/99009).
Bachmann et al., "Implement LDAP Search Queries with SQL," Dec. 1, 1998, IBM Disclosure.
Bartholomew, D., "The Future of Snail Mail: the Postal Service is gearing up for competition. But can it deliver?" Information Week, Dec. 4, 1995, n556, pp. 34-36.
Bhushan et al., "Federated Accounting: Service Charging and Billing in a Business-to-Business Environment," 0-7803-6719, IEEE, Jul. 2001, pp. 107-121.
"Purchasing tools for the Internet Toolbox." Carbone, Jim, Purchasing, vol. 123, Dec. 11, 1997 [recovered from Dialog database on Jun. 5, 2007].
"Recommendation F .400/X.400 message handling and directory services—operation and definition of service," Nov. 14, 1988, CCITT, Melbourne, XP002186347 (10 pages).
"Connect announces OneServer interactive online application platform," Business Wire, Apr. 10, 1995, p. 4101043, retrieved from Dialog, Dialog No. 07797909 (2 pages).
Stafford et al., "Delivering Marketing Expertise to the Front Lines," IEEE Expert, Apr. 1994, pp. 23-32.
Stephens, G., "Australia to Personalize New Stamps with Photographs of Show Visitors," Linn's Stamp News [on line], Mar. 22, 1999. (Retrieved on May 3, 2002 from www.lins.com/print/archives/20000403/news3.asp).

Czerny, "Customer Account Management System for STEWEAG Key Accounts," CIRED 97, Conf. Publ. No. 438, IEE, Jun. 2-5, 1997.
eBusiness Tools, Fedex Ship Manager Software (from Fedex Website http://www.fedex.com/us/ebusiness/eshipping/ship.html), accessed Nov. 28, 2001.
"Export management firms provide alternatives". Anonymous. Carin's Chicago Business. Chicago: Dec. 12, 1983. vol. 6, Issue 50; p. 17 [retrieved from ProQuest Dec. 19, 2005] (1 page).
Fast Facts, Back Issue (from Fedex Website http://www.fedex.com/us/customer/fastfacts/backissues/101100fastfacts.html) dated Oct. 11, 2000.
"Faster Freight: couriers and expedited carriers broaden their approach to better serve Canadian shippers". Materials Management and Distribution. Toronto: Oct. 1996, vol. 41, Issue 10; p. 34 [retrieved from ProQuest Dec. 19, 2005] (2 pages).
International Preliminary Examination Report in PCT/US01/08487, mailed Jan. 23, 2002, 4 pages.
International Preliminary Examination Report in PCT/US01/23177, mailed May 3, 2002, 4 pages.
International Preliminary Examination Report in PCT/US01/19421, mailed May 16, 2002, 4 pages.
International Preliminary Examination Report in PCT/US01/19384, mailed Jan. 17, 2003, 4 pages.
International Preliminary Examination Report in PCT/US01/08488, mailed Jun. 11, 2003, 11 pages.
International Preliminary Examination Report in PCT/US01/28001, mailed Aug. 8, 2003, 4 pages.
International Search Report, PCT/US00/27068, dated Apr. 5, 2001 (4 pages).
International Search Report, PCT/US01/23177, dated Oct. 18, 2001 (4 pages).
International Search Report, PCT/US01/19384, dated Nov. 16, 2001 (5 pages).
International Search Report, PCT/US01/19421, dated Nov. 19, 2001 (6 pages).
International Search Report, PCT/US01/27690, dated Nov. 19, 2001 (6 pages).
International Search Report, PCT/US01/28001, dated Dec. 21, 2001 (8 pages).
International Search Report, PCT/US01/08490, dated Jan. 22, 2002 (6 pages).
International Search Report, PCT/US02/04866, mailed May 23, 2002 (1 page).
International Search Report in PCT/US02/09870, mailed Dec. 5, 2002, 2 pages.
"Joint Direct Bill Payment Form for Mich. Utilities," Bank Technology News, Apr. 1994, p. 8, retrieved from Dialog, Dialog No. 03302326 (1 page).
Newkirk, K.M., "Banks can slice transaction costs," Independent Banker, Dec. 1995, vol. 45, No. 12, pp. 52-53, retrieved from Dialog, Dialog No. 00276769 (3 pages).
Office Action mailed Jul. 19, 2004, in U.S. Appl. No. 09/675,677 (9 pages).
Office Action mailed Apr. 21, 2005, in U.S. Appl. No. 09/675,677 (8 pages).
Office Action Mailed Jan. 12, 2006, in U.S. Appl. No. 09/675,677 (10 pages).
Office Action Mailed Oct. 19, 2006, in U.S. Appl. No. 09/675,677 (15 pages).
Office Action Mailed Jul. 17, 2007, in U.S. Appl. No. 09/675,677 (8 pages).
Office Action Mailed Mar. 17, 2008, in U.S. Appl. No. 09/675,677 (13 pages).
Office Action Mailed Nov. 4, 2008, in U.S. Appl. No. 09/675,677 (15 pages).
U.S. Appl. No. 09/675,677, filed Sep. 29, 2000.
PCT Written Opinion in PCT/US01/19384, mailed Jun. 17, 2002, 4 pages.

PCT Written Opinion in PCT/US01/08488, mailed Oct. 28, 2002, 9 pages.
PCT Written Opinion in PCT/US02/09870, mailed Mar. 6, 2003, 5 pages.
PCT Written Opinion in PCT/US02/04866, mailed May 23, 2003, 4 pages.

Q165: What is X.509 http://members.x5.net/faqs/crypto/q165.html Feb. 2, 1998.

* cited by examiner

SYSTEMS AND METHODS FOR ELECTRONIC POSTMARKING OF DATA INCLUDING LOCATION DATA

CROSS REFERENCE TO RELATED APPLICATIONS

This application claims priority from: U.S. Provisional Application Ser. No. 60/283,139, filed Apr. 12, 2001, by Charles R. Chamberlain and titled SYSTEMS AND METHODS FOR ELECTRONIC POSTMARKING INCLUDING LOCATION DATA, the disclosure of which is expressly incorporated herein by reference; U.S. application Ser. No. 09/675,677, filed Sep. 29, 2000, by Leo J. Campbell et al. and titled SYSTEMS AND METHODS FOR AUTHENTICATING AN ELECTRONIC MESSAGE, the disclosure of which is expressly incorporated herein by reference; and PCT Application Serial No. PCT/US01/47720, filed Dec. 17, 2001, by Charles R. Chamberlain and titled SYSTEM AND METHODS FOR ELECTRONIC POSTMARKING WITHOUT DIRECTLY UTILIZING AN ELECTRONIC POSTMARK SERVER, the disclosure of which is expressly incorporated herein by reference.

TECHNICAL FIELD

This invention, in general, relates to electronic postmarking of data. In particular, this invention relates to electronic postmarking of location data.

BACKGROUND

As described in U.S. application Ser. No. 09/675,677, filed Sep. 29, 2000, by Leo J. Campbell et al. and titled SYSTEMS AND METHODS FOR AUTHENTICATING AN ELECTRONIC MESSAGE, the disclosure of which is expressly incorporated herein by reference, an electronic postmark, or EPM, provides content and temporal integrity and identification authenticity for data, which is transferred over a network. Such EPMs have traditionally been used to authenticate the identity of the sender of a particular message or to authenticate the time/date at which the message was created. Increasingly, however, not only the identity and time/date of creation are important, but also the physical or geographic location of the sender of the message is significant.

Authenticated location or geographic information may be used for many purposes, including, for example, being able to establish with a certain degree of confidence the location at which a particular message or data was created. But, as noted above, the present systems and methods do not permit that. Accordingly, there exists a need for electronic postmarking of location or geographic data.

SUMMARY

Systems and methods consistent with the present invention permit electronic postmarking of location data.

In one embodiment consistent with the present invention, a method for performing electronic postmarking of data, including user data and location data is provided. The method includes receiving user data from a data acquisition/generation device. The method further includes receiving location data from a location data acquisition/generation device. The method further involves merging the user data with the location data to generate merged data. The method further comprises generating an electronic postmark data structure comprising a hash, value of the merged data and a time/date stamp.

Another embodiment consistent with the present invention is a method for performing electronic postmarking of data, including user data and location data. The method includes receiving user data from a data acquisition/generation device. The method further includes receiving location data from a location data acquisition/generation device. The method further involves merging the user data with the location data to generate merged data. The method further comprises generating an electronic postmark data structure comprising a hash value of the merged data, a time/date stamp, and a digital signature.

Yet another embodiment consistent with the present invention is a system for performing electronic post marking of data, including user data and location data. The system includes means for receiving user data from a data acquisition/generation device. The system further includes means for receiving location data from a location data acquisition/generation device. The system further involves means for merging the user data with the location data to generate merged data. The system further comprises means for generating an electronic postmark data structure comprising a hash value of the merged data and a time/date stamp.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and together with the description, serve to explain the principles of the invention. In the drawings.

DESCRIPTION OF THE EMBODIMENTS

Reference will now be made in detail to the exemplary embodiments consistent with the invention, examples of which are illustrated in the accompanying drawings. Wherever possible, the same reference numbers will be used throughout the drawings to refer to the same or like parts.

Systems and methods consistent with the present invention perform electronic postmarking of data, including location data. Electronic postmarking of location data enables one to authenticate the location data corresponding to a user data. For example, using the location data one may be able to determine the location where a particular image was captured, using for example, a digital camera. As used herein, the term "location data" includes, but is not limited to, data concerning the geographic location, GPS coordinates, position, altitude, longitude, latitude, or the direction of a data acquisition/generation device, such as a digital camera.

Figure 1:
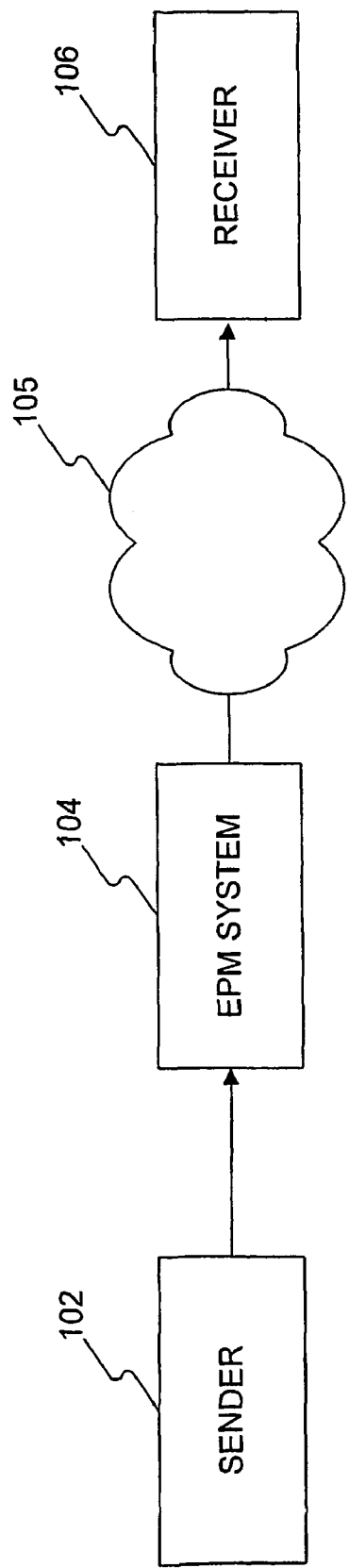
FIG. 1 shows an exemplary system environment consistent with the present invention.

FIG. 1 shows an exemplary system environment consistent with the present invention. A sender 102 (also referred to as a user), who has a data acquisition/generation device capable of acquiring or generating data, may send a message along with the acquired/generated data to an electronic postmarking system (EPM system) 104. As used herein, the term "data acquisition/generation device" includes, but is not limited to, a digital camera, a digital video recorder, a personal digital assistant, a handheld computer, a laptop computer, or any other device capable of acquiring, generating, and/or storing electronic data. EPM system 104, as discussed later, may generate an EPM using a regular EPM server, as described in U.S. application Ser. No. 09/675,677, filed Sep. 29, 2000, by Leo J. Campbell et al. and titled SYSTEMS AND METHODS FOR AUTHENTICATING AN ELECTRONIC MESSAGE. The EPM system may also generate an EPM using a MicroEPM device, as described in, PCT Application Serial No. PCT/US01/47720, filed Dec. 17, 2001, by Charles R. Chamberlain and titled SYSTEM AND METHODS FOR ELECTRONIC POSTMARKING WITHOUT DIRECTLY UTILIZING AN ELECTRONIC POSTMARK SERVER, the disclosure of which is expressly incorporated herein by reference. As used herein, the term "embedded electronic postmarking device" is used to refer to the MicroEPM device of the previously mentioned patent application. Accordingly, in one embodiment consistent with the present invention, an EPM device, such as a MicroEPM device, may be embedded in a data acquisition/generation device.

As shown in FIG. 1, sender 102 may send data, including location data, via a network 105, such as the Internet, to EPM system 104. The EPM system may then send the data to receiver 106, via a network, such as the Internet.

Figure 2A:
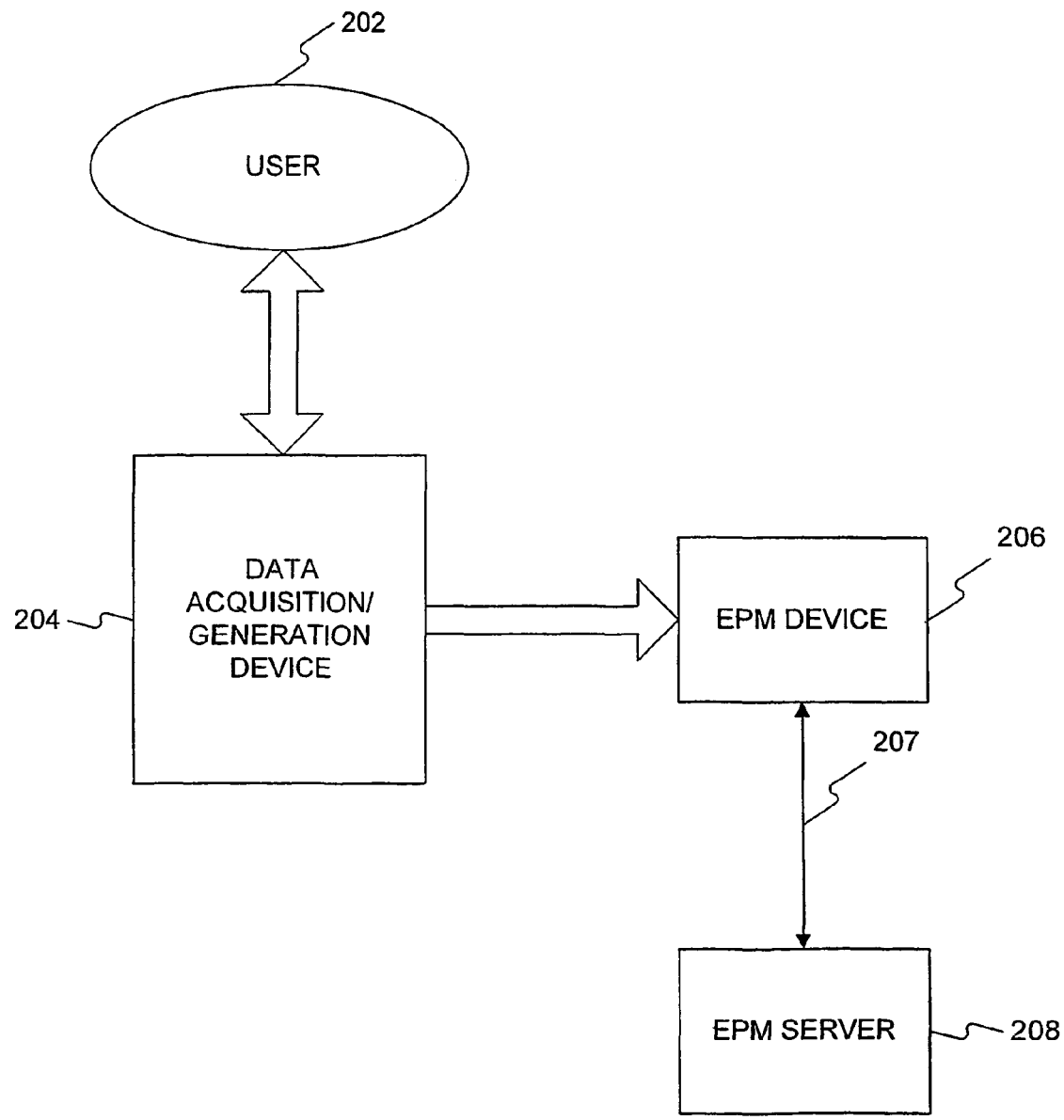
FIG. 2A shows an exemplary standalone electronic postmarking (EPM) device consistent with the present invention.

FIG. 2A shows an exemplary standalone electronic postmarking (EPM) device consistent with the present invention. A user 202 may operate a data acquisition/generation device 204 to generate data. As discussed above, data acquisition/generation device 204 can be any electronic device that is capable of generating, acquiring, and/or storing electronic data. Data acquisition/generation device 204 may transfer the acquired/generated user data to an external EPM device 206 through an interface 207. Data acquisition/generation device 204 may further include a location data sensor, such as a GPS sensor. Using the location data sensor (not shown), data acquisition/generation device 204 may generate data corresponding to the position, altitude, longitude, latitude, or the direction of a data acquisition/generation device, such as a digital camera.

In one embodiment, data acquisition/generation device may merge the user data and the location data to create merged data, which may then be transferred via an interface connecting data acquisition/generation device 204 and EPM device 206.

The interface connecting data acquisition/generation device 204 and EPM device 206 may be any interface that is capable of transferring information, including an electronic, optical or a combination thereof. In particular, the interface may be a network, such as the Internet, a local area network (wired or wireless). The interface could also be any of the interfaces used to connect electronic devices, for example, a serial or a parallel interface for connecting I/O devices to a computer, a Uniform Serial Bus, IEEE-1394, Bluetooth, or any other interface.

At the user's command, the merged data is sent from data acquisition/generation device 204 to EPM device 206. In one embodiment EPM device 206 may generate an electronic postmarking structure for the merged data and store the electronic postmarking structure locally. The stored electronic postmarking structure may then be transferred to EPM server 208. Alternatively, EPM device 206 may continue storing locally the electronic postmarking structures, which may be later transferred in a batch to EPM server 208.

Figure 2B:
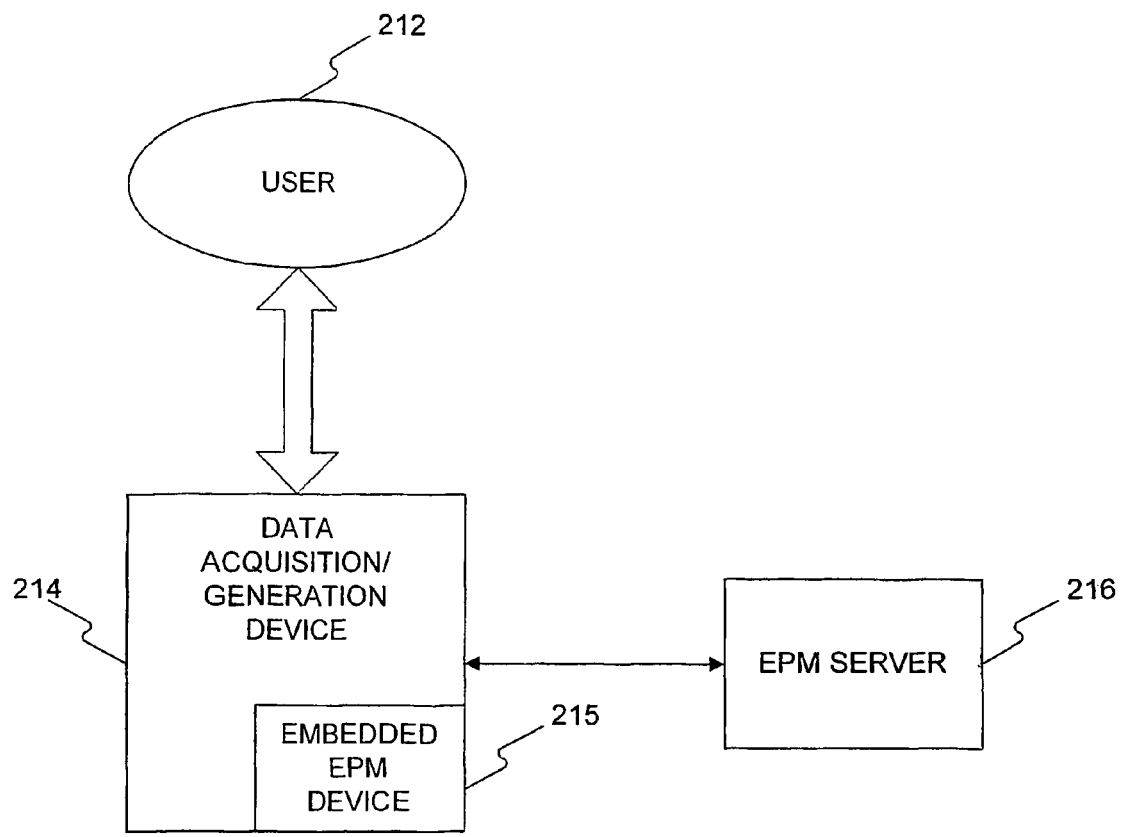
FIG. 2B shows an exemplary embedded EPM device consistent with the present invention.

FIG. 2B shows an exemplary embedded EPM device 215 consistent with the present invention. According to this embodiment an EPM device 215 may be embedded or physically incorporated into a data acquisition/generation device 214. As above, data acquisition/generation device 214 can be any electronic device that is capable of generating, acquiring, and/or storing electronic data. User data and location data may be transferred within the data acquisition/generation device to embedded EPM device 215 upon a user command or it may be transferred automatically. Data acquisition/generation device 214 may connect to an EPM server 216 for the generation of a batch EPM of the stored electronic postmarks.

Figure 3:
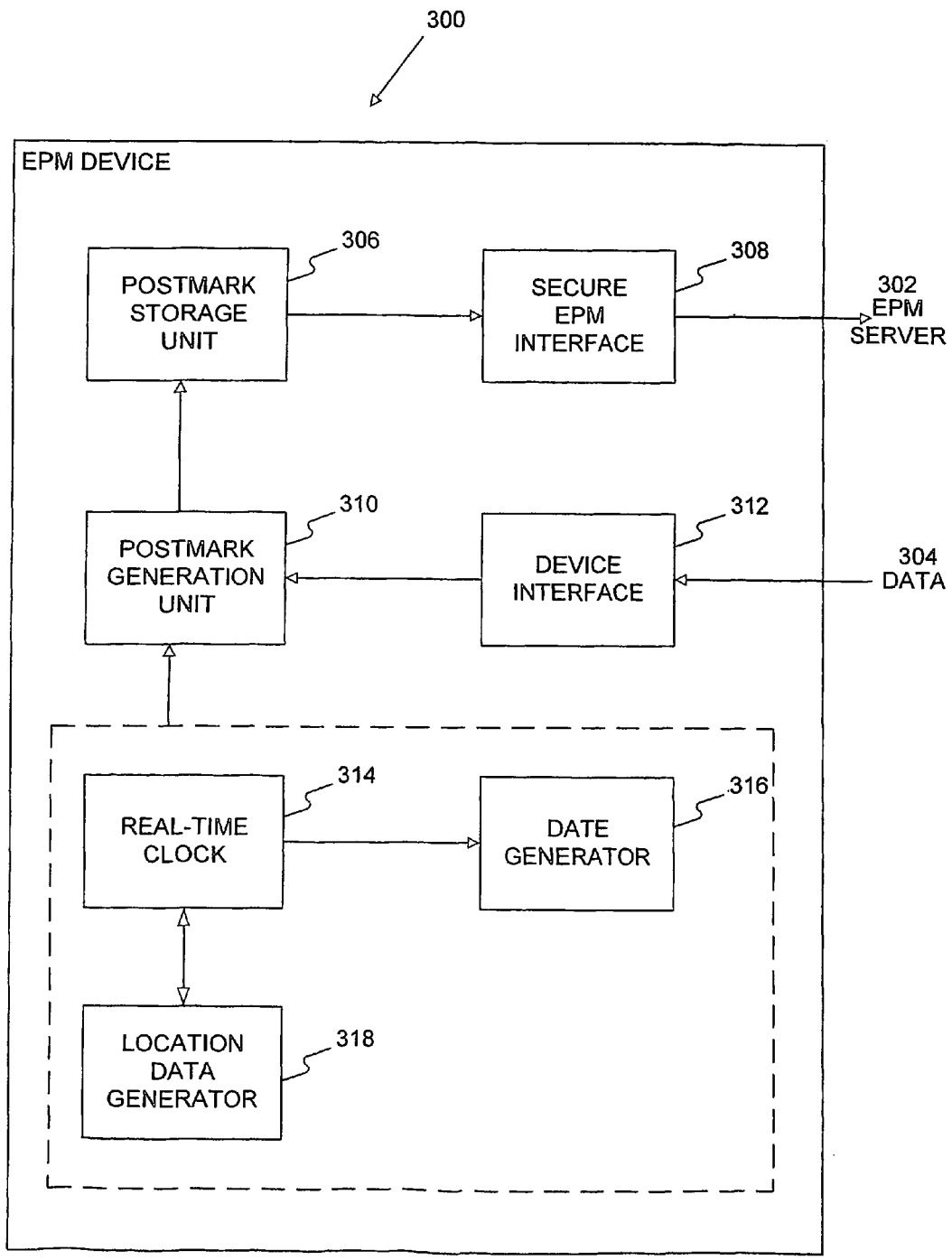
FIG. 3 shows an exemplary block diagram of an EPM device consistent with the invention.

FIG. 3 shows an exemplary block diagram of an EPM device 300 consistent with the invention. The exemplary EPM device may include a postmark storage unit 306, a secure EPM interface 308, a postmark generation unit 310, a device interface 312, a real-time clock 314, a date generator 316, and a location data generator 318. Using real time data from real-time clock 314, user data and/or location data 304, a private key, and/or location data from location data generator 318, a postmark generation unit 310 creates an electronic postmark data structure. Postmark generation unit may be a software module executing on a general-purpose microprocessor or an application specific integrated circuit ("ASIC"). The generated electronic postmark data structure may be stored in postmark storage unit 306. Postmark storage unit 306 may be RAM, a flash memory, a hard drive, or any other appropriate type of electronic or optical storage.

A plurality of electronic postmark data structures may be stored in the postmark storage unit for transfer in a single batch later. At the user's command, either a single electronic postmark data structure or a plurality of electronic postmark data structures may be transferred to EPM server 302 via secure EPM interface 308. Data, including user data and/or location data may arrive via device interface 312. A key interface (not shown) may accept a private key from an official source, such as the United States Postal Service (USPS), or any other trusted source of private keys (as described in the aforementioned U.S. application Ser. No. 09/675,677, filed Sep. 29, 2000).

Location data generator 318 may comprise at least one of a geo-position sensor, an altitude sensor, and a directional sensor. The geo-position sensor may generate longitude and/or latitude information. The altitude sensor may acquire information concerning the altitude of the data acquisition/generation device at the time data, such as a digital picture was acquired. The directional sensor may, for example, provide information concerning the direction in which the data acquisition/generation device, is pointing at the time user data, such as a digital image from a digital camera, was generated.

Figure 4:
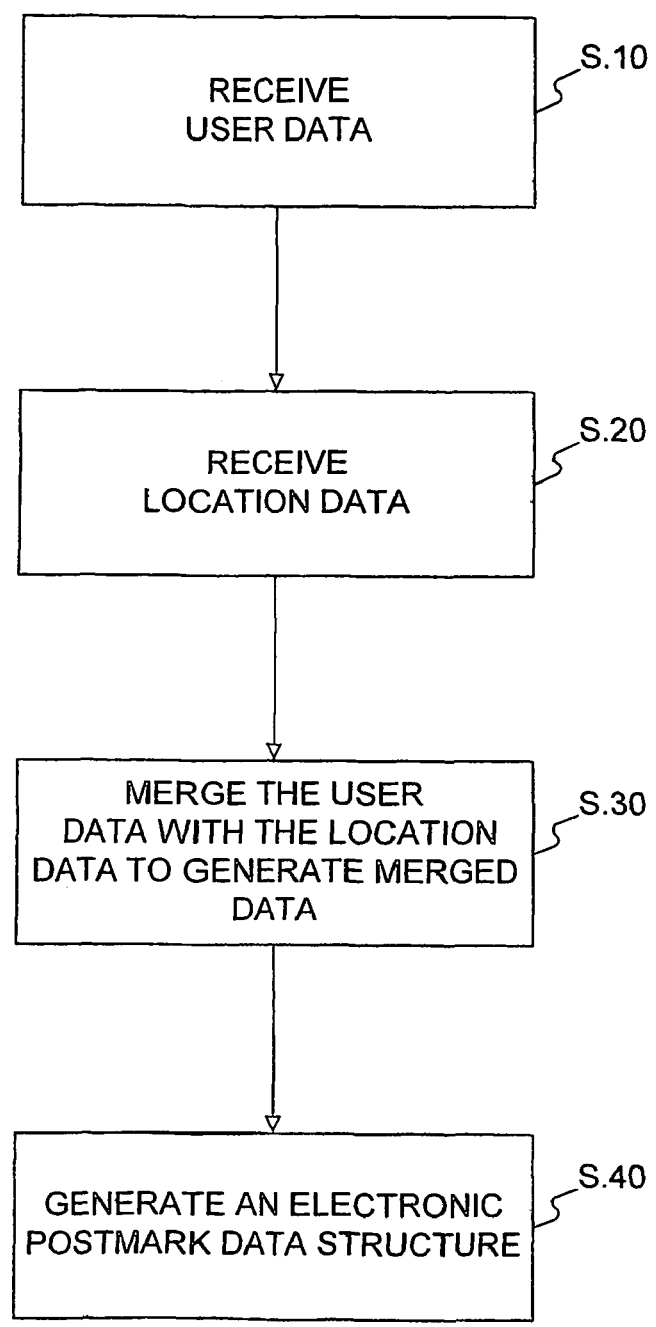
FIG. 4 shows a flowchart of an exemplary method for performing electronic postmarking of data, including user data and location data.

FIG. 4 shows a flowchart of an exemplary method for performing electronic postmarking of data, including user data and location data. In stage S.10, user data, including, for example, user acquired and/or user generated data, is received by an EPM device, such as the EPM device of FIG. 3. User data may either be acquired or generated locally or it may be received via device interface 312 of FIG. 3.

In stage S.20, location data, including, for example, geo-position coordinates of the data acquisition/generation device, is received by the EPM device. Location data may be received via device interface 312 of FIG. 3 or may be locally generated using location data generator 318 of FIG. 3.

In stage S.30, user data is merged with the location data to create merged data., A software module (which is not shown in FIG. 3) loaded in the memory (not shown) associated with the EPM device may perform this function. Alternatively, merging of the data may also be performed by the data acquisition/generation device.

In stage S.40, an electronic postmark data structure is generated. As part of this stage, several sub-stages may occur. In one embodiment, the merged data obtained from the previous stage is hashed using, for example, a one-way hash function. As part of this sub-stage, any known or later developed hash function may be used. In one embodiment, a hash function, which produces a 64-bit key may be used. The hash may then be time/date stamped. Time may be obtained using real-time clock 314 of FIG. 3. Date may be obtained using date generator 316 of FIG. 3. Alternatively a time/date stamp may be obtained from a trusted external source.

In one embodiment, the electronic postmark data structure may be generated comprising the hash value of the merged data and the time/date stamp. Alternatively, the electronic postmark data structure may be generated comprising the hash value of the merged data, the time/date stamp, and a digital signature comprising, for example, a private key. A digital signature may be produced by first performing a secure hash algorithm by using, for example, the Secure Hash Standard FIPS 180-1 on the data to be signed, to produce a secure hash value. The secure hash value may then be processed using a digital signature algorithm (DSA) and a unique private key to produce two data values. These data values may comprise the digital signature, which may then be appended to the hash value and the time/date stamp to form an electronic postmark data structure.

In one embodiment after an electronic postmark data structure is generated, as discussed above, the generated electronic postmark data structure may be stored in a log. Alternatively, a data entry corresponding to the generated electronic postmark data structure may be stored in the log. The log may be located at EPM server 110 of FIG. 3.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for performing electronic postmarking of data, including sender data and sender location data, the method comprising:
   receiving, in electronic storage, sender data and sender location data from a data acquisition/generation device comprising a location data sensor;
   merging, using a computing device, the sender data with the sender location data to generate merged data; and
   generating, using the computing device, an electronic postmark data structure comprising:
      generating a hash value from the merged data and
      generating a time/date stamp.

2. The method of claim 1, wherein the stage of generating the electronic postmark data structure includes generating a digital signature for inclusion in the electronic postmark data structure.

3. The method of claim 1, wherein the sender location data includes at least one of position, altitude, longitude, latitude, and direction.

4. The method of claim 1, wherein the stage of generating the electronic postmark data structure includes forwarding the merged data to an electronic postmarking server.

5. The method of claim 1, wherein the stage of generating the electronic postmark data structure includes forwarding the merged data to an embedded electronic postmarking device.

6. The method of claim 5, wherein the embedded electronic postmarking device is embedded in the data acquisition/generation device.

7. The method of claim 1, wherein the data acquisition/generation device is one of a digital camera, a digital video recorder, a personal digital assistant, a handheld computer, a laptop computer, and other device capable of generating and storing electronic data.

8. The method of claim 1, wherein the location data sensor is at least one of a GPS sensor, an altitude sensor, a position sensor, a latitude sensor, a longitude sensor, and a direction sensor.

9. The method of claim 1, further comprising:
   storing the generated electronic postmark data structure in a log file.

10. A computer-implemented method for performing electronic postmarking of data, including sender data and sender location data, the method comprising:
   receiving, in electronic storage, sender data and sender location data from a data acquisition/generation device comprising a location data sensor;
   merging, using a computing device, the sender data with the sender location data to generate merged data; and
   generating, using the computing device, an electronic postmark data structure comprising:
      generating a hash value from the merged data,
      generating a time/date stamp, and
      generating a digital signature.

11. The method of claim 10, wherein the sender location data includes at least one of position, altitude, longitude, latitude, and direction.

12. The method of claim 10, wherein the stage of generating the electronic postmark data structure includes forwarding the merged data to an electronic postmarking server.

13. The method of claim 10, wherein the stage of generating the electronic postmark data structure includes forwarding the merged data to an embedded electronic postmarking device.

14. The method of claim 13, wherein the embedded electronic postmarking device is embedded in the data acquisition/generation device.

15. The method of claim 10, wherein the data acquisition/generation device is one of a digital camera, a digital video recorder, a personal digital assistant, a handheld computer, a laptop computer, and other device capable of generating and storing electronic data.

16. The method of claim 10, wherein the location data sensor is at least one of a GPS sensor, an altitude sensor, a position sensor, a latitude sensor, a longitude sensor, and a direction sensor.

17. A system for performing electronic postmarking of data, including sender data and sender location data, the system comprising:
   a storage device containing computer instructions; and
   a processor, connected to the storage device, that executes the computer instructions to perform operations comprising:
      receiving sender data and sender location data from a data acquisition/generation device comprising a location data sensor;
      merging the sender data with the sender location data to generate merged data; and generating an electronic postmark data structure comprising a hash value from the merged data and a time/date stamp.

18. The system of claim 17, wherein generating the electronic postmark data structure includes generating a digital signature for inclusion in the electronic postmark data structure.

19. The system of claim 17, wherein the sender location data includes at least one of position, altitude, longitude, latitude, and direction.

20. The system of claim 17, wherein generating the electronic postmark data structure includes forwarding the merged data to an electronic postmarking device.

21. The system of claim 17, wherein generating the electronic postmark data structure includes forwarding the merged data to an embedded electronic postmarking device.

22. The system of claim 21, wherein the embedded electronic postmarking device is embedded in the data acquisition/generation device.

23. The system of claim 17, wherein the data acquisition/generation device is one of a digital camera, a digital video recorder, a personal digital assistant, a handheld computer, a laptop computer, and other device capable of generating and storing electronic data.

24. The system of claim 17, wherein the location data sensor is at least one of a GPS sensor, an altitude sensor, a position sensor, a latitude sensor, a longitude sensor, and a direction sensor.

* * * * *